United States Patent
Chang et al.

(10) Patent No.: US 11,126,503 B2
(45) Date of Patent: Sep. 21, 2021

(54) PRE-FILTERING OF JOIN EXECUTION OVER MULTI-COLUMN RANGE SUMMARIES AND OTHER SYNOPSES

(71) Applicant: International Business Machines Corporation, Armonk, NY (US)

(72) Inventors: Yuan Chi Chang, Armonk, NY (US); Timothy Ray Malkemus, Round Rock, TX (US); Mohammad Sadoghi Hamedani, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 15/233,220

(22) Filed: Aug. 10, 2016

(65) Prior Publication Data
US 2018/0046550 A1 Feb. 15, 2018

(51) Int. Cl.
| | | |
|---|---|---|
| *G06F 16/00* | (2019.01) | |
| *G06F 11/14* | (2006.01) | |
| *G06F 16/2453* | (2019.01) | |
| *G06F 11/20* | (2006.01) | |

(52) U.S. Cl.
CPC .... *G06F 11/1451* (2013.01); *G06F 16/24535* (2019.01); *G06F 16/24544* (2019.01); *G06F 11/2094* (2013.01); *G06F 11/2097* (2013.01); *G06F 2201/80* (2013.01); *G06F 2201/84* (2013.01)

(58) Field of Classification Search
None
See application file for complete search history.

(56) References Cited

U.S. PATENT DOCUMENTS

| | | | |
|---|---|---|---|
| 7,945,575 B2 | 5/2011 | Cushing et al. | |
| 8,341,099 B2* | 12/2012 | Khosravy | G06Q 10/10 706/12 |
| 9,946,750 B2* | 4/2018 | Cole | G06F 16/24542 |
| 10,380,112 B2* | 8/2019 | Bodziony | G06F 16/24544 |

(Continued)

OTHER PUBLICATIONS

Disclosed Anonymously, "System and Method of Generalized Multi-Dimensional Stats Based on Tight Coupling Join Logics," IP.com No. IPCOM000222365D, Sep. 27, 2012, 5 pages.

(Continued)

*Primary Examiner* — Debbie M Le
(74) *Attorney, Agent, or Firm* — Ryan, Mason & Lewis, LLP (57) ABSTRACT

Techniques are provided for pre-filtering of join execution over multi-column range summaries and other synopses. An exemplary method comprises maintaining a synopsis for a plurality of data tables, wherein a given synopsis summarizes a set of records in a corresponding data table; and, in response to a request for a join operation for a set of the data tables: joining the synopses associated with the set of data tables to generate a joined synopsis; for joined records in the joined synopsis, obtaining corresponding records from the set of data tables as candidate records; and joining the candidate records. Two or more of the set of data tables can be distributed across a plurality of nodes and the synopses can be replicated and/or broadcasted across the plurality of nodes. Incremental updates to broadcasted and/or replicated synopses are optionally provided to at least one node.

20 Claims, 10 Drawing Sheets

(56) References Cited

U.S. PATENT DOCUMENTS

| | | | |
|---|---|---|---|
| 10,725,994 B2* | 7/2020 | Finlay | G06F 16/283 |
| 2003/0084043 A1* | 5/2003 | Acharya | G06F 17/30489 |
| 2012/0166417 A1* | 6/2012 | Chandramouli | G06F 17/30463 707/713 |
| 2014/0337314 A1 | 11/2014 | Potapov et al. | |
| 2015/0347549 A1 | 12/2015 | Chang et al. | |
| 2016/0378829 A1* | 12/2016 | Vengerov | G06F 17/30469 707/714 |
| 2019/0034486 A1* | 1/2019 | Bodziony | G06F 16/24537 |

OTHER PUBLICATIONS

Disclosed Anonymously, "System and Method to Efficiently Query Data in Distributed Environment Using Multi-Dimension Data Replica," IP.com No. IPCOM000209140D, Jul. 29, 2011, 10 pages.

Disclosed Anonymously, "Method and System for Duplicating a Relational Database and Query Workload Based on Data Sampling and Query Generation Techniques," IP.com No. IPCOM000205109D, Mar. 15, 2011, 7 pages.

M. Stonebraker et al., "C-Store: A Column-Oriented DBMS," Proceedings of the 31st International Conference on Very Large Data Bases (VLDB), Aug. 2005, pp. 553-564.

S.S. Lightstone et al., "Automated Design of Multidimensional Clustering Tables for Relational Databases," Proceedings of the 30th International Conference on Very Large Data Bases (VLDB), Aug.-Sep. 2004, pp. 1170-1181, vol. 30.

S. Padmanabhan et al., "Multi-Dimensional Clustering: A New Data Layout Scheme in DB2," Proceedings of the ACM SIGMOD International Conference on Management of Data, Jun. 2003, pp. 634-638.

B. Bhattacharjee et al., "Efficient Query Processing for Multi-Dimensionally Clustered Tables in DB2," Proceedings of the 29th International Conference on Very Large Data Bases (VLDB), Sep. 2003, pp. 963-974, vol. 29.

Mel, et al., "The NIST Definition of Cloud Computing", Special Publication 800-145, Computer Security Division, Information Technology Laboratory, National Institute of Standards and Technology, Gaithersburg, MD, pp. M-7 thru M-13 (2011).

"NIST Cloud Computing Program", http://www.nist.gov/itl.cloud/, downloaded on Jul. 28, 2016.

Chang et al., "Data Skipping and Compression Through Partitioning of Data" U.S. Appl. No. 14/821,915, filed Aug. 10, 2015.

* cited by examiner

| | A | B | C | D | ... |
|---|---|---|---|---|---|
| 1 | $a_1$ | $b_1$ | $c_1$ | $d_1$ | |
| 2 | $a_1$ | $b_1$ | $c_3$ | $d_3$ | |
| 3 | $a_1$ | $b_3$ | $c_1$ | $d_8$ | |
| 4 | $a_2$ | $b_2$ | $c_2$ | $d_1$ | |
| 5 | $a_2$ | $b_2$ | $c_2$ | $d_9$ | |
| 6 | $a_3$ | $b_3$ | $c_1$ | $d_2$ | |

FIG. 1A

| | A | B | C | D | ... |
|---|---|---|---|---|---|
| 1-3 | $a_1$ | $b_1$-$b_3$ | $c_1$-$c_3$ | $d_1$-$d_8$ | |
| 4-5 | $a_1$ | $b_2$ | $c_2$ | $d_1$-$d_9$ | |
| 6 | $a_1$ | $b_3$ | $c_1$ | $d_2$ | |

PRE-FILTERING OF JOIN EXECUTION OVER MULTI-COLUMN RANGE SUMMARIES AND OTHER SYNOPSES

FIELD

The present invention relates generally to the field of data management, and more particularly to the execution of join operations for data in database tables.

BACKGROUND

Traditional analytical query processing is limited by the need to identify and maintain a multitude of indexes for data records. Analytical queries aggregate data record values based on a group of data record rows. Identifying the correct indexes for analytical query processing has been a challenge in real-world applications and has been a burden on database administrators. In addition, maintaining a multitude of indexes increases the update overhead cost in transaction processing and in operational data stores.

Synopses, such as multi-column range summaries on sets of correlated attributes, horizontal data record alignment tables and other summaries of minimum and maximum values in data blocks, have been proposed to overcome the problems of identifying and maintaining indexes for data records. For example, multi-column range summaries on sets of correlated columns of data records within a database table have been proposed to speed up data record queries.

Data skipping is primarily achieved using synopses for selection queries. Data skipping skips unnecessary processing of irrelevant or duplicate data, loading only the information that needs to be analyzed. Specifically, data skipping refers to scanning a column (or table) to find rows that qualify for a given query and skip over data that doesn't qualify for the query. When skipping irrelevant data, the irrelevant data is not read into memory from disk and processing resources are not demanded to find out why those irrelevant rows/columns are not needed in the first place.

Multi-column range summaries are generally limited to data skipping for when scanning a single relation. In real customer situations, however, (1) data is often distributed across a number of machines, and (2) queries often go beyond simple selection queries and comprise complex join operations spanning a number of machines.

A need therefore exists for improved query techniques to improve local and distributed processing of join operations over multi-column range summaries and other synopses.

SUMMARY

In one embodiment of the present invention, techniques are provided for pre-filtering of join execution over multi-column range summaries and other synopses. An exemplary computer-implemented method can include maintaining a synopsis for a plurality of data tables, wherein a given synopsis summarizes a set of records in a corresponding data table; and, in response to a request for a join operation for a set of the data tables, performing the following steps: joining the synopses associated with the set of data tables to generate a joined synopsis; for joined records in the joined synopsis, obtaining corresponding records from the set of data tables as candidate records; and joining the candidate records.

In at least one embodiment, the synopses comprise multi-column data record range summaries, horizontal data record alignment tables, outlier values, data point distributions and/or summaries of minimum and maximum values in data blocks.

In one or more embodiments, at least two of the set of data tables are distributed across a plurality of nodes and wherein the synopses are replicated and/or broadcasted across the plurality of nodes. For example, the response to the request for the join operation for the set of data tables can further comprise the step of broadcasting one or more of the synopses to at least one of the plurality of nodes. Incremental updates to broadcasted synopses and/or replicated synopses are optionally provided to at least one node.

In an exemplary embodiment, at least two of the set of data tables are distributed across a plurality of nodes, the request for the join operation is processed by a given node and wherein the response to the request for the join operation for the set of data tables further comprises the step of processing the joined synopses to obtain corresponding records from the set of data tables stored by other nodes as candidate records, and further comprising the step of joining, using at least one processing device of the given node, the candidate records.

These and other objects, features and advantages of the present invention will become apparent from the following detailed description of illustrative embodiments thereof, which is to be read in connection with the accompanying drawings.

DETAILED DESCRIPTION

Illustrative embodiments of the present invention will be described herein with reference to exemplary communication, storage, and processing devices. It is to be appreciated, however, that the invention is not restricted to use with the particular illustrative configurations shown. One or more embodiments of the present invention provide methods and apparatus for pre-filtering of join execution over multi-column range summaries and other synopses, such as horizontal data record alignment tables, outliers values, data point distributions (and possibly lossy form as long as the boundary of its values is precise) and other summaries of minimum and maximum values in data blocks. For example, if all values are between 1 and 10, and there is only one additional value that is 400, then instead of saying that the range is 1-400, the range can be defined as (min, max) is 1-10, with one (or more) outlier, which in this case is 400. The disclosed pre-filtering join operations can be applied in any database application where data summarization is performed.

One or more embodiments of the invention provide methods and apparatus for pre-filtering of join execution over multi-column range summaries and other synopses. In at least one embodiment, the applicability of multi-column range summaries is extended through distributed replication of these summaries to perform pre-filtering of both local and non-local join execution.

One of the key challenges of executing non-co-located join operations in a distributed setting is transferring data among nodes during the query execution in order to perform the actual join operation. In at least one embodiment, only the multi-column range summaries are replicated (or transferred) among nodes in order to first perform approximate join operations locally based on these summaries, and then, only for those potentially qualified blocks of data, actually transfer (or fetch) the data. This technique can be utilized even within a single node by executing an approximate join phase on a summary table before joining the actual data.

One or more embodiments of the invention scan and skip data blocks of columns in a database (e.g., a relational database), where the data blocks of columns are given by scanning a synopsis of a base table in the database, as discussed further below. Data skipping is primarily achieved using a synopsis (e.g., a summary of minimum/maximum values in a data block).

Multi-Column Range Summary Synopses

Conventionally, one of techniques to speed up analytical queries in an operational data store/database is to identify and build many indexes. Identifying the right indexes has been a challenge in a real-world setting and a significant burden on database administrators. In addition, maintaining indexes increases the updates cost in transaction processing (also prevalent in operational data stores) and all changes to indexes must be logged, yet another prohibitive cost. To overcome the problems of identifying and maintaining indexes, a paradigm for speeding up queries is explored through multi-column range summaries on an ordered set of correlated attributes, for example, scanning and locating the most relevant data, based on columns instead of rows which results in faster processing.

As noted above, multi-column range summaries on sets of correlated columns of data records within a database table have been used to speed up data record queries. A multi-column range summary is a table that identifies ranges of data record values corresponding to each column of an ordered set of correlated columns within each different data record group identified in the ordered set of correlated columns.

A multi-column data record range summary table enables the speeding up of a database query, which has a set of one or more predicates defined on the ordered set of correlated columns, by quickly pruning or eliminating different groups of data records that are shown in the multi-column data record range summary table to not match the set of query predicates. A query predicate restricts which data record rows within the database table are returned by the query. In other words, the query predicate eliminates all data record rows from the query result that do not evaluate to "True". For example, if a query predicate defines a particular data record value or a particular range of data record values, then only those data record values that satisfy the query predicate are included in the result and all other data record values are pruned or eliminated from the result.

One or more exemplary embodiments optionally selectively replicate subgroups of data records to generate horizontally aligned data record groups and subgroups on a set of coarsified and correlated data record columns. As a result, illustrative embodiments are able to answer analytical queries efficiently, as long as the queries have a predicate defined on any of the correlated columns in a set of correlated columns. It should be noted that a higher correlation between data records within the set of correlated columns naturally results in a lower replication of data record subgroups. Thus, one or more illustrative embodiments utilize a horizontal alignment of data record groups with their corresponding virtually replicated data record subgroups using data record coarsification of a set of correlated columns and selective replication of data record subgroups to generate aligned data record groups and subgroups over the set of correlated columns to speed up analytical queries. Illustrative embodiments do not store or materialize any of the virtually replicated data record subgroups. Illustrative embodiments align the data record groups and corresponding virtually replicated data record subgroups by values or content. For example, if a data record point query is for data record $c_1$, then illustrative embodiments retrieve all data record groups and subgroups that include the data record $c_1$.

Horizontal data record alignment means that data records are replicated across multi-column range summaries to obtain a better sort order through coarsification of data records within a set of highly correlated columns of data records. For example, ORDER DATE, INVOICE DATE, SHIPPING DATE, and PAYMENT DATE columns of a database table are likely to be highly correlated columns based on a Year value. In determining the sort order, illustrative embodiments sort a single Year value for all the columns and the same data record identifier may appear more than once if more than one distinct data record value exists across the set of correlated columns.

For a discussion of horizontal data record alignment, see, United States Published Patent Application No. 2015/0347549, entitled "Database Query Processing Using Horizontal Data Record Alignment of Multi-Column Range Summaries."

It should be noted that multi-column data record range summaries, with or without horizontal data record alignment, are beneficial because of lower update costs and fewer database objects to maintain, which requires less database administrator involvement in tuning, maintaining, and replicating of these objects. In short, the horizontal data record alignment of illustrative embodiments pushes the limit of multi-column data record range summaries to autonomously speed up the processing of analytical queries. Further, it should be noted that a hybrid approach also is possible by combining the multi-column data record range summaries with indexes and materialized views. One motivation behind such a hybrid approach is to utilize the autonomous and low-maintenance nature of multi-column range summaries and to utilize fewer instances of indexes and materialized views to reduce the maintenance and storage costs associated with them.

Figure 1A:
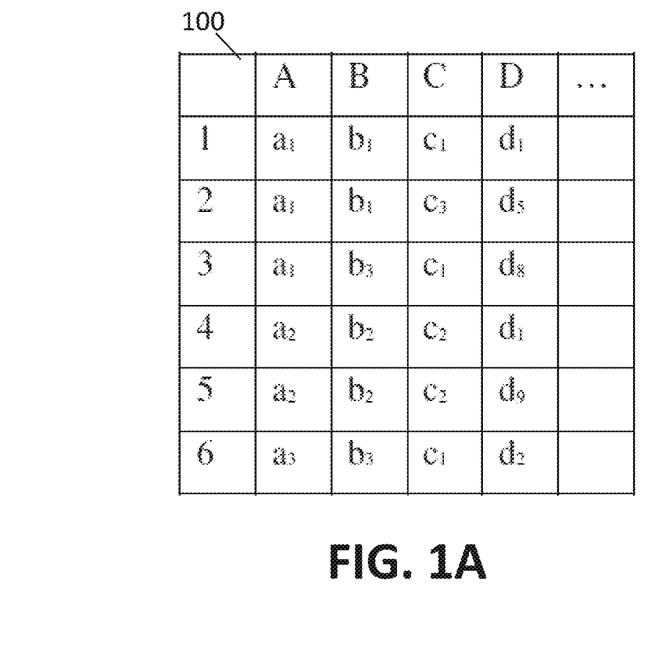
FIG. 1A illustrates an exemplary base table in a database, used to illustrate at least one embodiment of the invention.
Figure 1B:
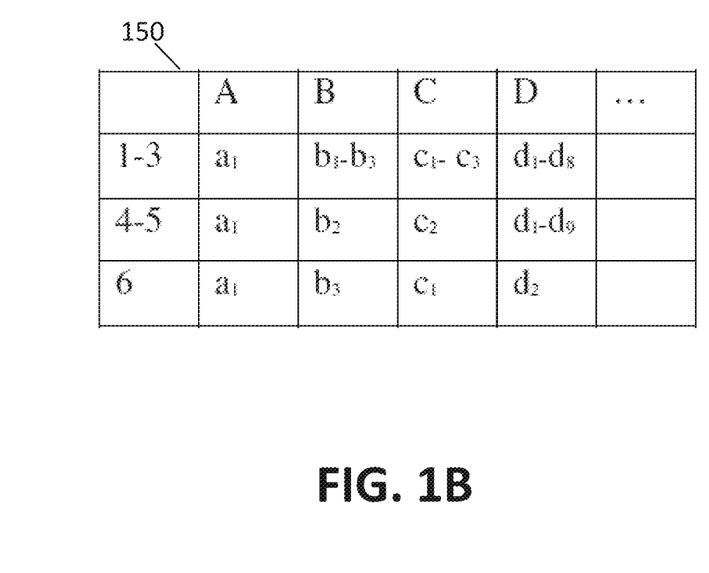
FIG. 1B illustrates an exemplary synopsis of the base table of FIG. 1A.

FIG. 1A illustrates an exemplary base table 100 in a database, used to illustrate at least one embodiment of the invention. FIG. 1B illustrates an exemplary synopsis 150 of the base table 100 of FIG. 1A. Conventionally, one way for multi-column range summary is a summary of minimum/maximum values in data block, also referred to as synopsis, by which data skipping is primarily achieved. Synopsis typically requires the scanning of the entire synopsis for all queries.

FIG. 1A illustrates an exemplary base table 100 in a database, and FIG. 1B illustrates an exemplary synopsis 150 of the base table 100 of FIG. 1A. FIGS. 1A and 1B provide an example of obtaining a synopsis 150 from a base table 100. Generally, the base table 100 in a database is converted to a synopsis 150 of the base table 100 by summarizing the minimum/maximum values in data blocks. Herein, the data block refers to a chunk of data or a set of records in the base table 100. For example, in FIG. 1A, rows 1-3, which are referred to as a data block in the base table, are grouped to reduce to one single row in the synopsis 150 in FIG. 1B. In addition, the data in column B of rows 1-3 in the base table 100 is summarized to data b1-b3 (min-max) in the synopsis 150.

Synopsis 150 comprises a multi-column range summary table with a summary of data record values across all of the columns (i.e., A, B, C, D, . . . ) of the exemplary base table 100 based on different groups of data records (i.e., the first group with value $a_1$ in rows 1-3, the second group with value $a_2$ in rows 4 and 5, and the third group with value $a_3$ in row 6).

One or more embodiments of the invention provide methods and apparatus for pre-filtering of join execution over synopses, such as the multi-column range summary 150 shown in FIG. 1B.

Figure 2:
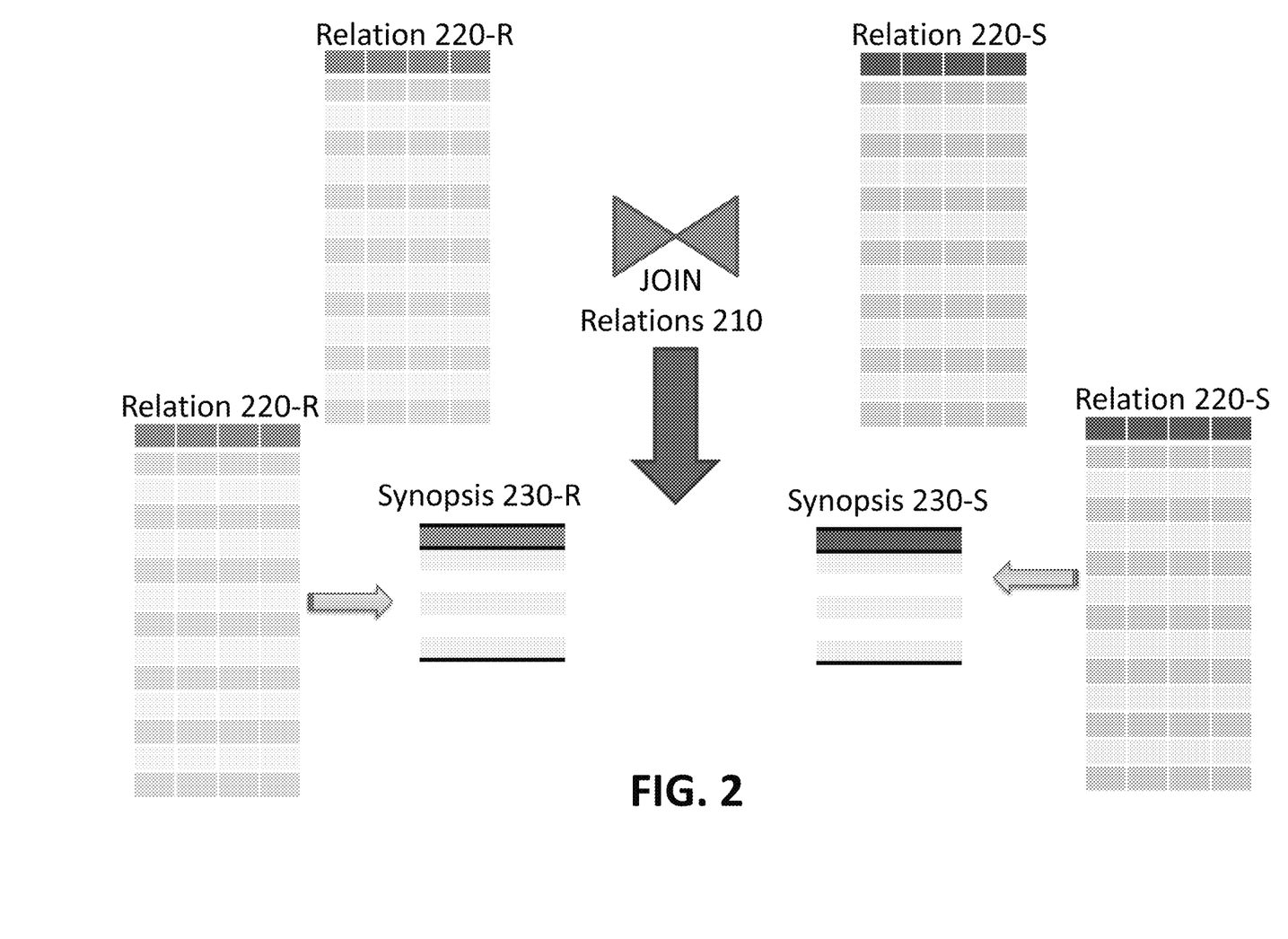
FIG. 2 illustrates a local join operation of two data relations, each having a corresponding synopsis, according to one embodiment of the invention.

FIG. 2 illustrates a local join operation of two data relations 220-R and 220-S, each having a corresponding synopsis 230-R and 230-S, according to one embodiment of the invention. As shown in FIG. 2, a user on a particular user device (e.g., a single machine) requests a join 210 of the two relations 220-R and 220-S. The relations 220-R and 220-S have corresponding synopses 230-R and 230-S, in a similar manner as FIGS. 1A and 1B. The relations 220-R and 220-S will be joined using a join algorithm.

Figure 3:
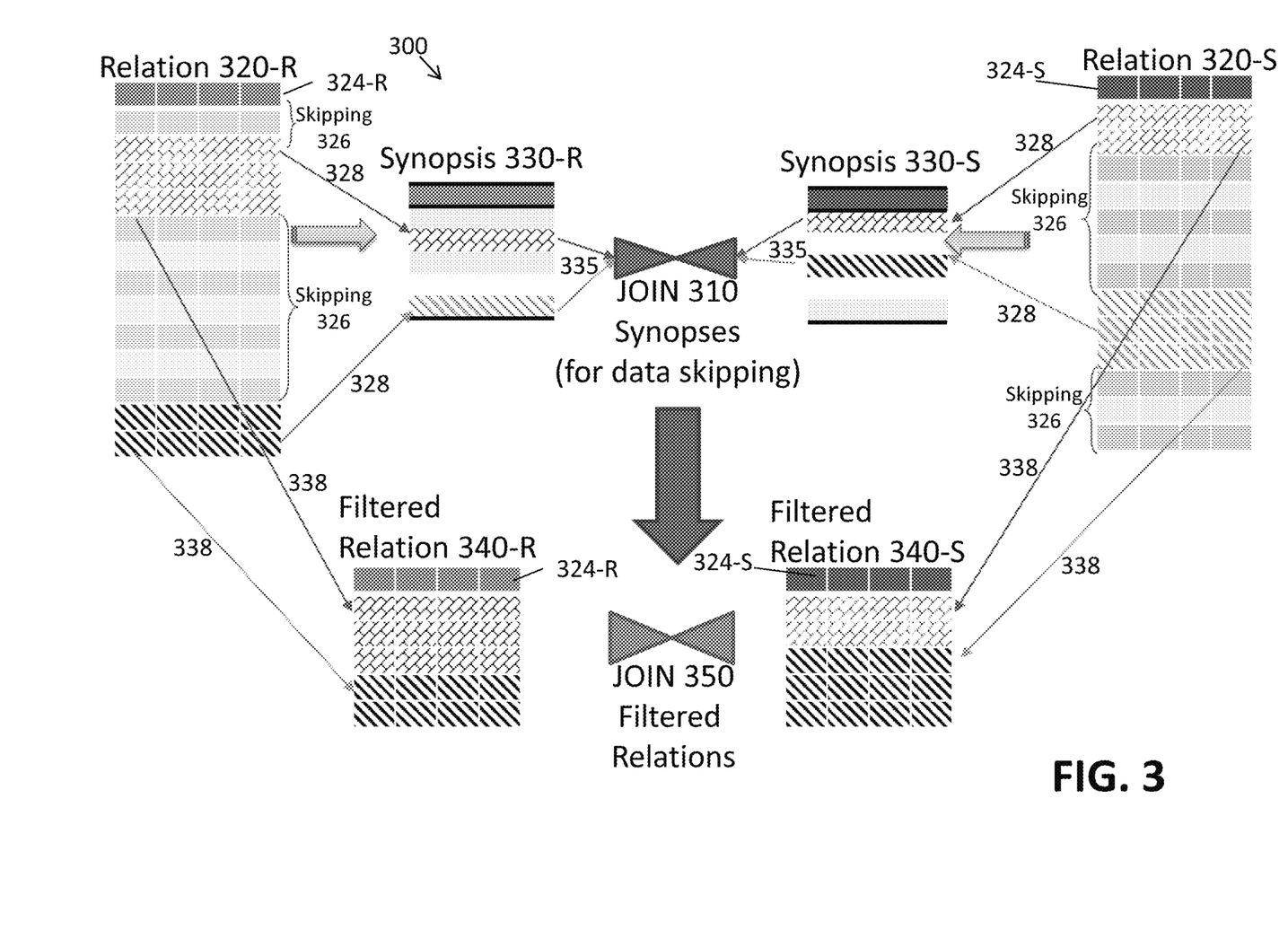
FIG. 3 illustrates a local join operation of two data relations, each having a corresponding synopsis, according to one embodiment of the invention.

FIG. 3 illustrates a local join operation 300 of two data relations 320-R and 320-S, each having a corresponding synopsis 330-R and 330-S, according to one embodiment of the invention. As shown in FIG. 3, a user on a particular user device (e.g., a single machine) initially requests a join of the two relations 320-R and 320-S. The relations 320-R and 320-S have corresponding synopses 330-R and 330-S, in a similar manner as FIG. 2. In addition, the relations 320-R and 320-S have corresponding headers/schemas 324-R and 324-S, in a known manner.

Generally, the synopses 330-R and 330-S identify the data records that are not shared in both relations 320-R and 320-S. The data records that are not shared in both relations 320-R and 320-S are skipped, in a known manner, using a data skipping technique 326. The shared data records in both relations 320-R and 320-S are indicated in FIG. 3 with a corresponding hash pattern. The multiple shared data records in both relations 320-R and 320-S are collapsed at stage 328 into a single entry in the synopses 330-R and 330-S. The shared data records in both relations 320-R and 320-S are joined in accordance with the present invention using a local join filtering operation through a synopsis approach.

As shown in FIG. 3, a first join operation 310 is first performed on the synopses 330-R and 330-S, rather than on the actual tables of relations 320-R and 320-S, to generate a joined synopsis (not shown) that combines at stage 335 the summaries of the shared data records. As noted above, the synopses 330-R and 330-S are used for data skipping. The synopses 330-R and 330-S indicate the shared data records in both relations 320-R and 320-S.

A second join operation 350 is then performed using the joined synopsis to (i) extract the shared data records from both relations 320-R and 320-S, to create at stage 338 filtered relations 340-R and 340-S, and then to (ii) join the filtered relations 340-R and 340-S.

As noted above, data is often distributed across a number of machines, and queries often go beyond simple selection queries and comprise complex join operations spanning a number of machines.

Figure 4:
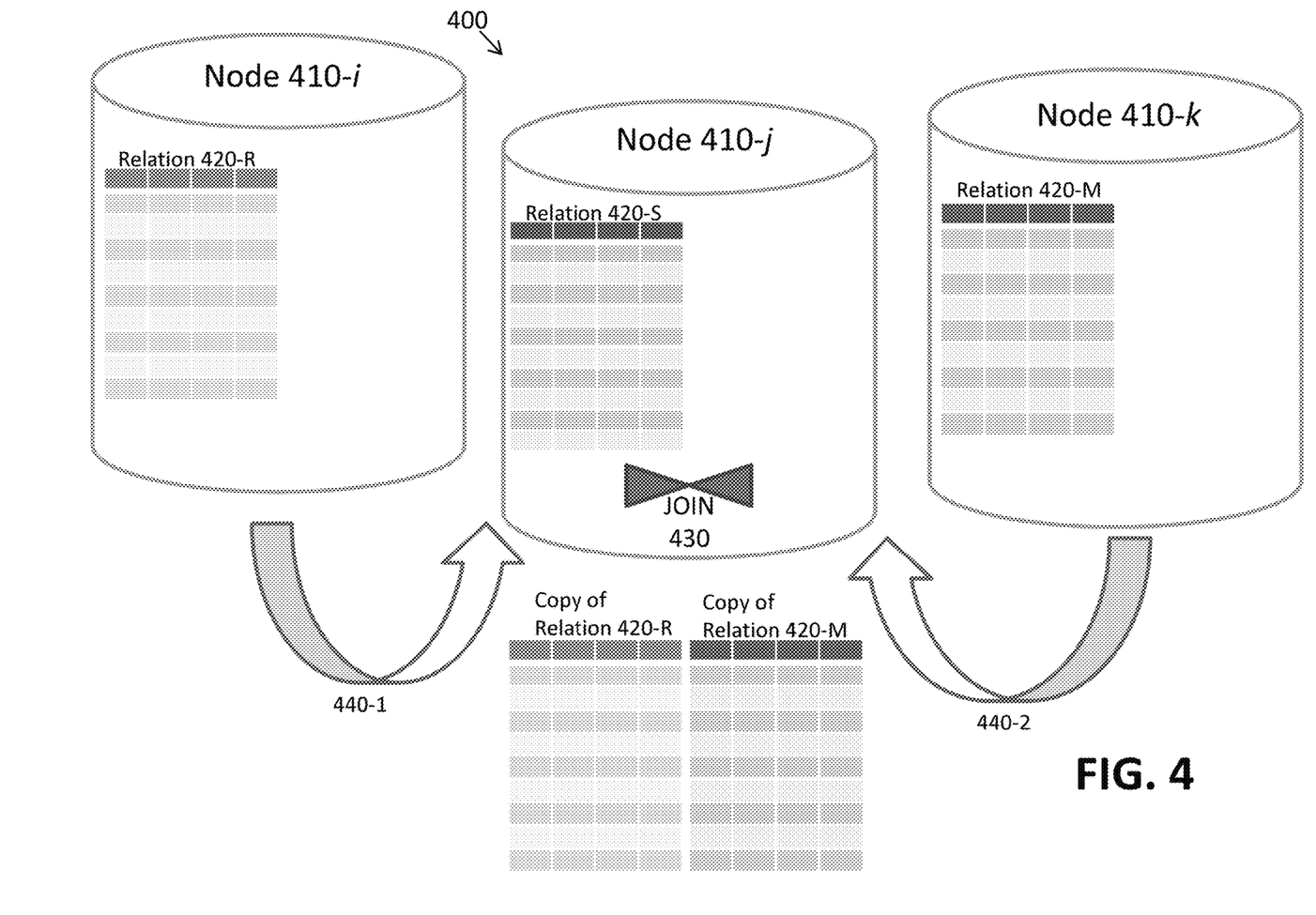
FIG. 4 illustrates a distributed join operation of three data relations on different network nodes and having a corresponding synopsis, according to one embodiment of the invention.

FIG. 4 illustrates a distributed join operation 400 of three data relations 420-R, 420-S and 420-M, each on a different network node 410-$i$ through 410-$k$ and having a corresponding synopsis (not shown in FIG. 4). As shown in FIG. 4, a user on a particular node 410-$j$ initially requests to join 430 the three relations 420-R, 420-S and 420-M.

In the implementation of FIG. 4, a naïve broadcasting approach is employed to implement the join operation 430, whereby the data relations 420 from the other nodes 410 are copied to the requesting node 410. In the example of FIG. 4, the join operation 430 is issued on node 410-$j$, so a copy of relation 420-R is sent to node 410-$j$ by node 410-$i$ at step 440-1. In addition, a copy of relation 420-M is sent to node 410-$j$ by node 410-$k$ at step 440-2. In this manner, the node 410-$j$ has a copy of all of the data relations 420-R, 420-S and 420-M needed to implement the join operation 430.

Figure 5:
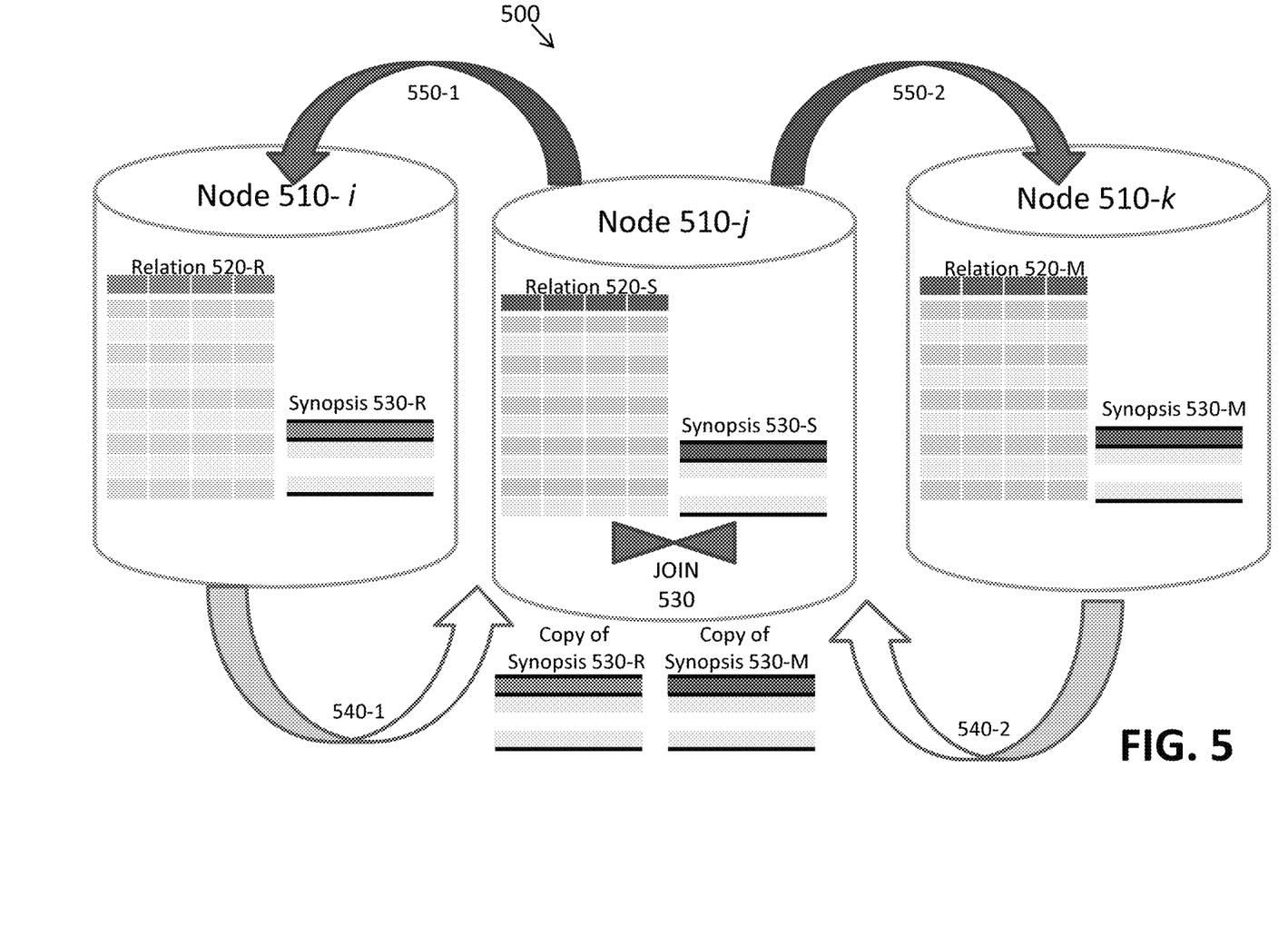
FIG. 5 illustrates a distributed join operation of three data relations on different network nodes and having a corresponding synopsis, according to a synopsis broadcasting embodiment of the invention.

FIG. 5 illustrates a distributed join operation 500 of three data relations 520-R, 520-S and 520-M, each on a different network node 510-$i$ through 510-$k$ and having a corresponding synopsis 530-R, 530-S and 530-M, according to one embodiment of the invention. As shown in FIG. 5, a user on a particular node 510-$j$ initially requests to join 530 the three relations 520-R, 520-S and 520-M.

In the implementation of FIG. 5, a synopsis broadcasting approach is employed to implement the join operation 530, whereby the synopses 530 from the other nodes 510 are copied to the requesting node 510. In the example of FIG. 5, the join operation 530 is issued on node 510-$j$, so a copy of synopsis 530-R is sent (e.g., pushed) to node 510-$j$ by node 510-$i$ at step 540-1. In addition, a copy of synopsis 530-M is sent (e.g., pushed) to node 510-$j$ by node 510-$k$ at step 540-2. In this manner, the node 510-$j$ has a copy of all of the synopses 530-R, 530-S and 530-M needed to implement the join operation 530.

Thereafter, node 510-$j$ requests only the portion of relation 520-R that passed the join filtering from node 510-$i$ during step 550-1 and the filtered version of relation 520-R (in a similar manner as FIG. 3) is sent from node 510-$i$ to requesting node 510-$j$. In addition, node 510-$j$ requests only the portion of relation 520-M that passed the join filtering from node 510-$k$ during step 550-2 and the filtered version of relation 520-M (in a similar manner as FIG. 3) is sent from node 510-$k$ to requesting node 510-$j$. The filtered relations 520-R, 520-S and 520-M are then joined by node 510-$j$.

Figure 6:
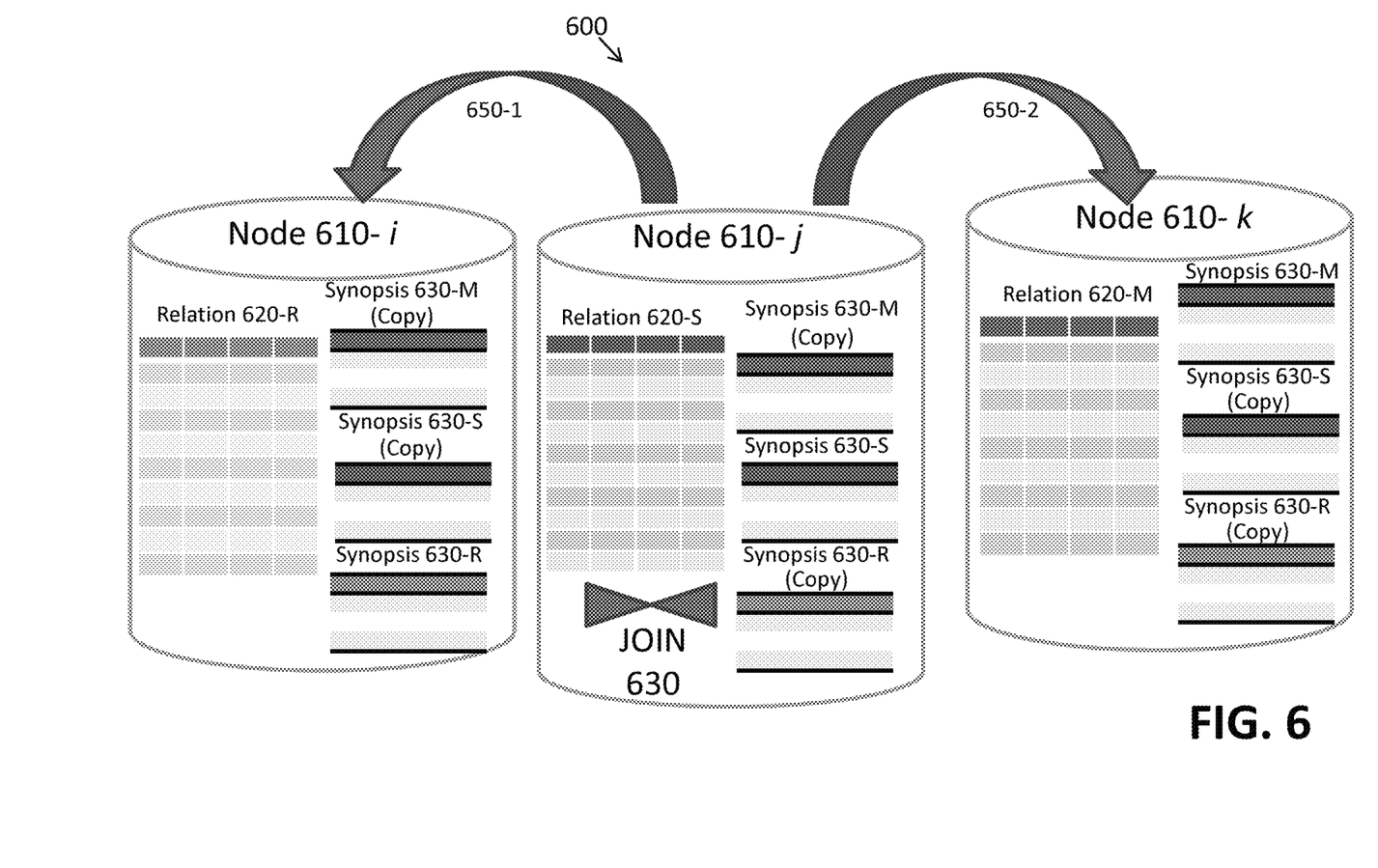
FIG. 6 illustrates a distributed join operation of three data relations on different network nodes and having a corresponding synopsis, according to a local synopsis replication embodiment of the invention.

FIG. 6 illustrates a distributed join operation 600 of three data relations 620-R, 620-S and 620-M, each on a different network node 610-*i* through 610-*k* and having a corresponding synopsis 630-R, 630-S and 630-M, according to one embodiment of the invention. As shown in FIG. 6, a user on a particular node 610-*j* initially requests to join 630 the three relations 620-R, 620-S and 620-M.

In the implementation of FIG. 6, a local synopsis replication approach is employed, whereby the synopses 630 from all nodes 610 are automatically replicated to the other nodes 610. In the example of FIG. 6, each node 610, such as node 610-*j*, has its own synopsis 630-S, as well as copies of the synopses 630-M and 630-R from the other nodes 610-*k* and 610-*i*, respectively.

As shown in FIG. 6, a join operation 630 is issued on node 610-*j*. The node 610-*j* already has a copy of all of the synopses 630-R, 630-S and 630-M needed to implement the join operation 630. The node 610-*j* requests only the portion of relation 620-R that passed the join filtering from node 610-*i* during step 650-1 and the filtered version of relation 620-R (in a similar manner as FIG. 3) is sent from node 610-*i* to requesting node 610-*j*. In addition, node 610-*j* requests only the portion of relation 620-M that passed the join filtering from node 610-*k* during step 650-2 and the filtered version of relation 620-M (in a similar manner as FIG. 3) is sent from node 610-*k* to requesting node 610-*j*. The filtered relations 620-R, 620-S and 620-M are then joined by node 610-*j*.

It is noted that a given synopsis does not always have to be replicated to all nodes. For example, the given synopsis can be sent over a network to interested nodes, as needed and/or on demand. Also, even if the given synopsis is replicated, the given synopsis may not be needed to be replicated to all nodes. For example, if data in node X and node Y are never joined together, then there is no need to replicate synopses between these two nodes. The synopses to replicate and the nodes that will receive the replicated synopses can be learned, for example, from query workloads.

Figure 7:
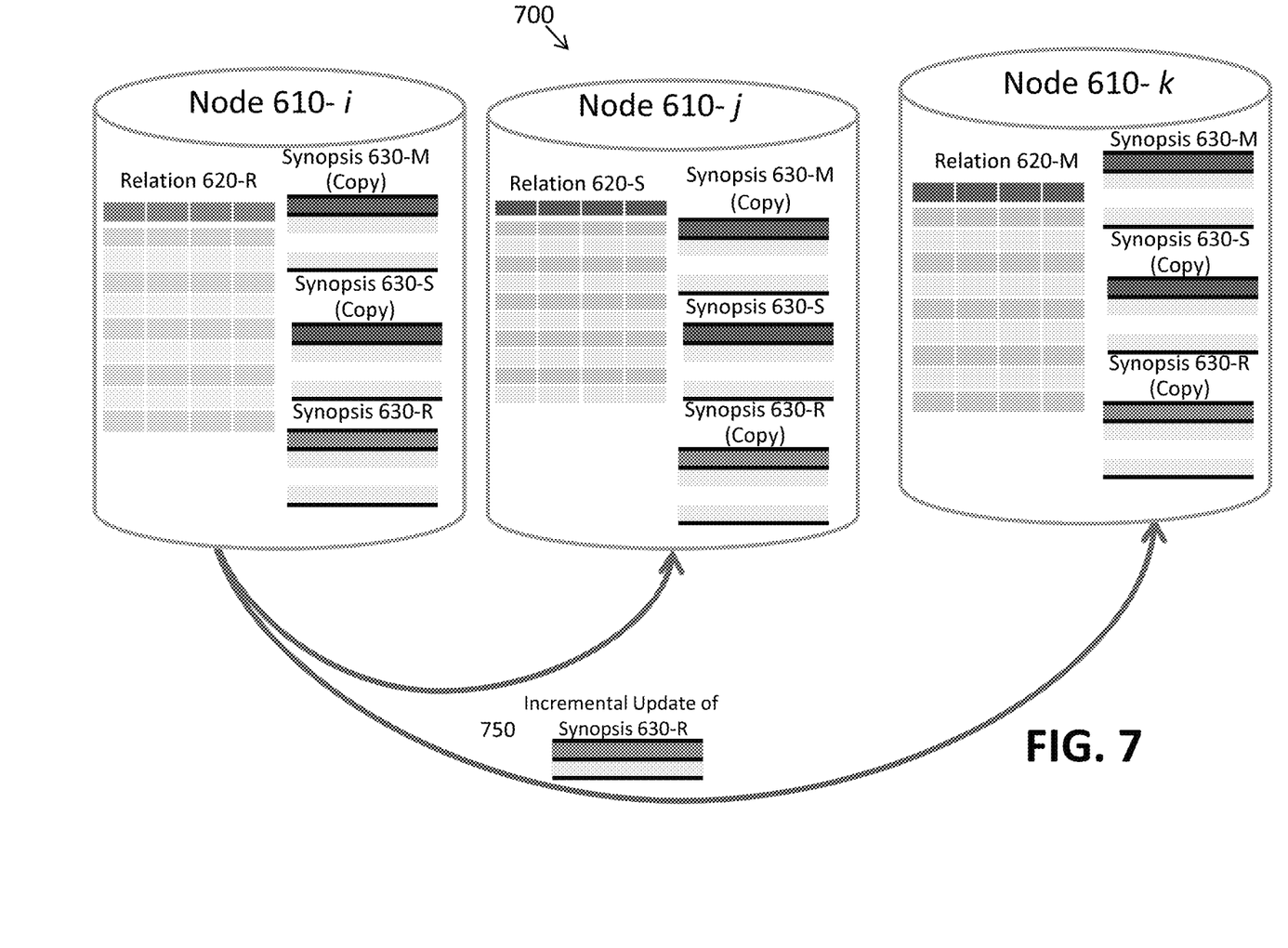
FIG. 7 illustrates a synopsis update process for broadcasting incremental updates to the replicated synopses on the different network nodes of FIG. 6, according to one embodiment of the invention.

FIG. 7 illustrates a synopsis update process 700 for broadcasting incremental updates to the replicated synopses 630 on the different network nodes 610-*i* through 610-*k* of FIG. 6. As shown in FIG. 7, when a synopsis 630 on a given node is updated, for example, following insertions and deletions in the respective data relation 620, an incremental update of the synopsis 630 is broadcast to the other nodes during step 750 and merged with the copy of the synopsis 630 maintained by the other nodes. For example, when synopsis 630-R on node 610-*i* is updated, an incremental update of the synopsis 630-R is broadcast by node 610-*i* to the other nodes 610-*j* and 610-*k* and merged with the copy of the synopsis 630-R maintained by the other nodes 610-*j* and 610-*k*.

The pre-filtering join techniques depicted herein can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the pre-filtering join techniques depicted herein can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 8:
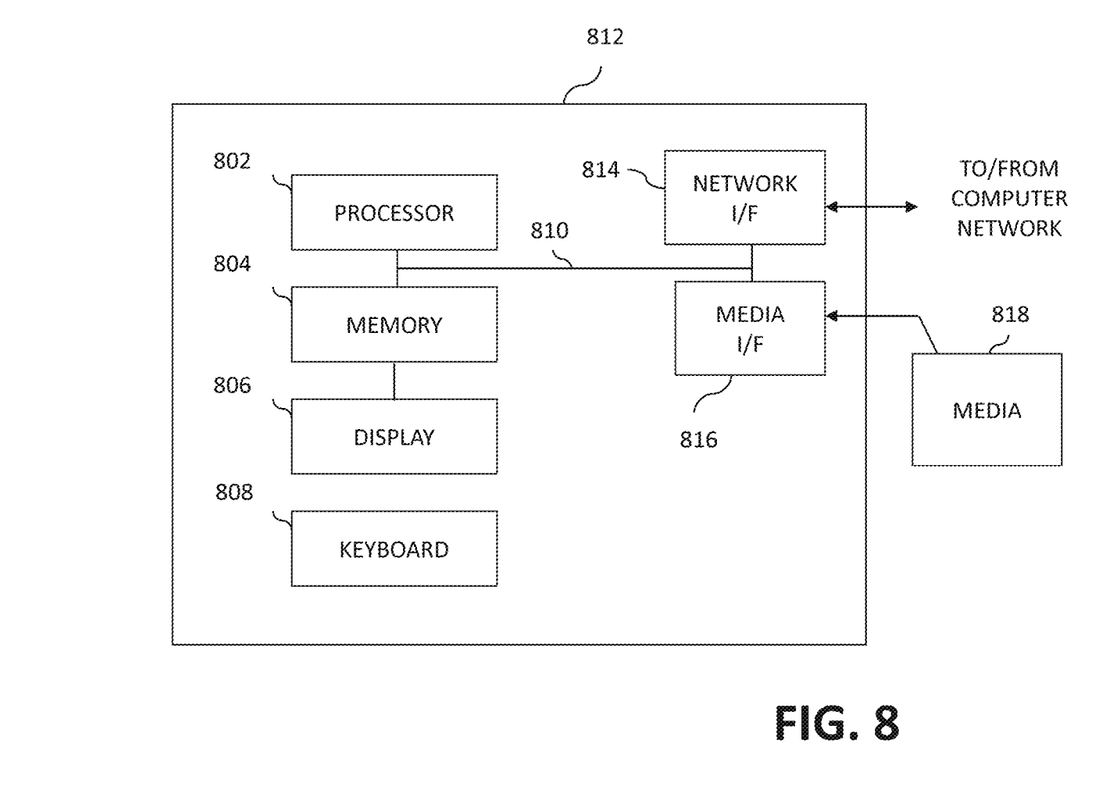
FIG. 8 is a system diagram of an exemplary computer system on which at least one embodiment of the invention can be implemented.

Additionally, an embodiment of the present invention can make use of software running on a computer or workstation. With reference to FIG. 8, such an implementation might employ, for example, a processor 802, a memory 804, and an input/output interface formed, for example, by a display 806 and a keyboard 808. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

Figure 9:
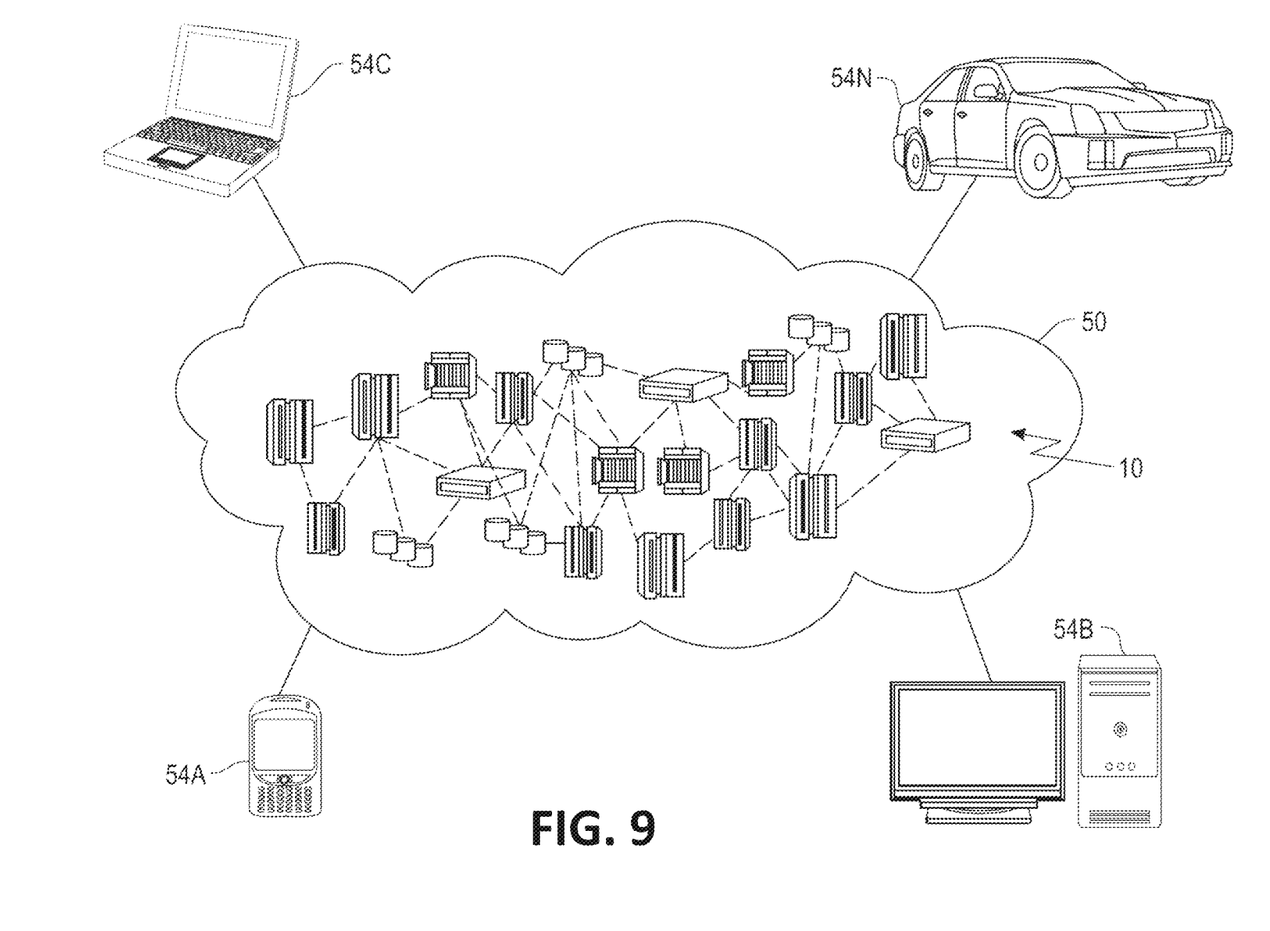
FIG. 9 depicts a cloud computing environment according to an embodiment of the present invention.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
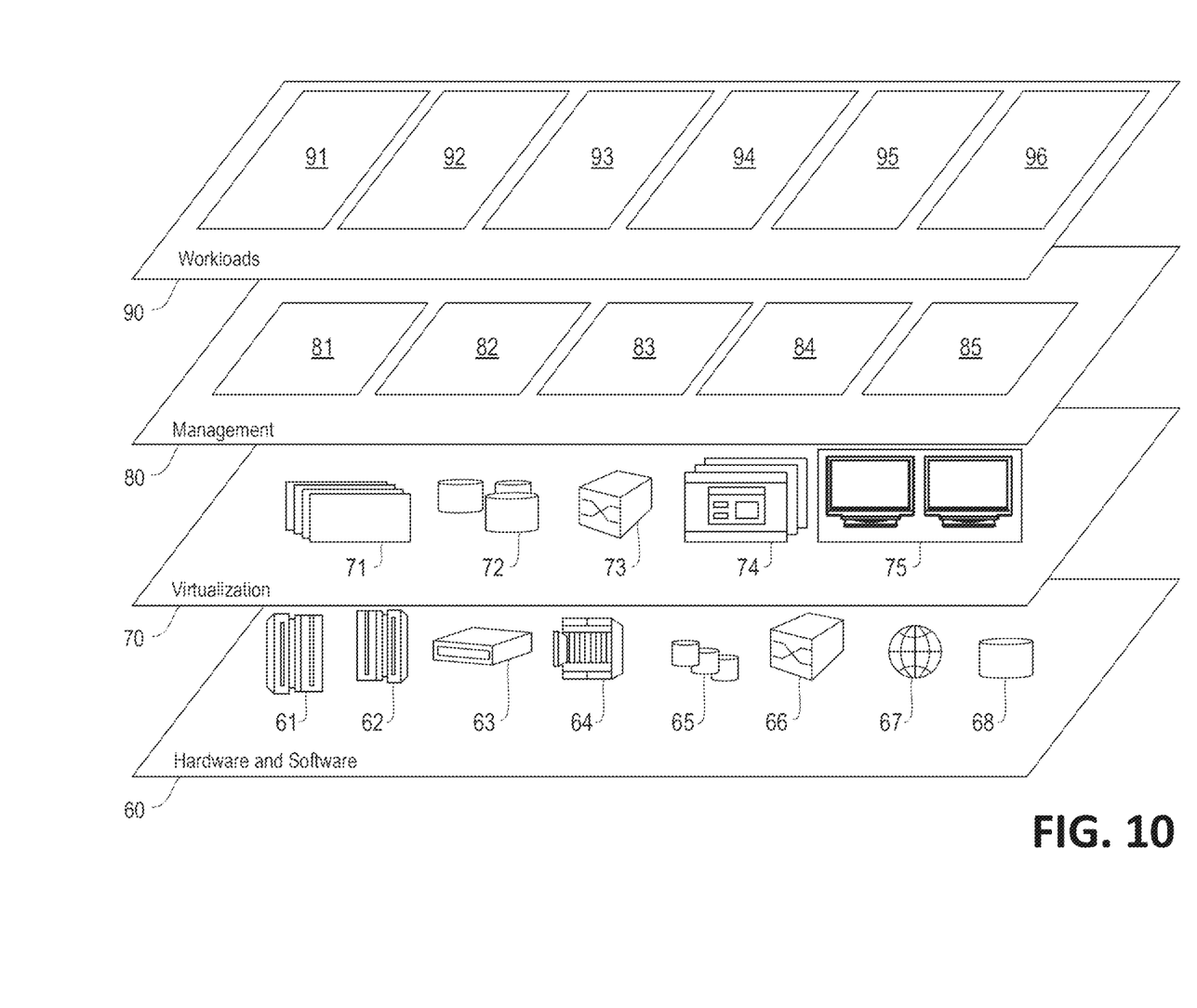
FIG. 10 depicts abstraction model layers according to an embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 64; storage devices 65; networks and networking components 66. In some embodiments software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and pre-filtering join functionality according to the present invention 96.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations, pseudo code and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart, pseudo code and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 802. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is understood in advance that one or more embodiments of the invention are capable of being implemented in conjunction with any type of computing environment now known, such as cloud computing, or later developed.

For example, cloud computing is a model of service delivery for enabling convenient, on-demand network access to a shared pool of configurable computing resources (for example, networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (for example, country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (for example, storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (for example, web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (for example, host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (for example, mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (for example, cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, implementing pre-filtering join function.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    maintaining a synopsis for each of a plurality of data tables on at least one network node, wherein a given synopsis summarizes a set of records in a corresponding data table, and wherein maintaining the given synopsis comprises grouping at least two of the records in the set of records into a combined record; and
    in response to a request for a join operation for a set of at least two of said data tables that are distributed across a plurality of network nodes, performing the following steps:
    joining, using at least one processing device of a given network node, the synopses associated with said set of data tables to generate a joined synopsis, wherein the joined synopsis comprises one or more of the combined records that are present in each of the synopses associated with said set of data tables;
    for joined records in said joined synopsis, obtaining, using the at least one processing device of the given network node, corresponding records from said set of data tables stored by other network nodes as candidate records; and
    joining, using at least one processing device of the given network node, the candidate records.

2. The method of claim 1, wherein said synopses comprise one or more of multi-column data record range summaries, horizontal data record alignment tables, outlier values, data point distributions and summaries of minimum and maximum values in data blocks.

3. The method of claim 1, wherein said synopses are replicated across said plurality of network nodes.

4. The method of claim 1, wherein said response to said request for said join operation for said set of data tables further comprises the step of broadcasting one or more of said synopses to at least one of said plurality of network nodes.

5. The method of claim 1, further comprising:
providing incremental updates to one or more of broadcasted synopses and replicated synopses to at least one network node.

6. The method of claim 1, further comprising:
computing a final join after said candidate records are received.

7. The method of claim 1, further comprising:
reducing said candidate records to actual joined records.

8. The method of claim 1, wherein software is provided as a service in a cloud environment.

9. A computer program product, comprising a computer readable storage medium having program instructions embodied therewith, the program instructions executable by a device to cause the device to:
maintain a synopsis for each of a plurality of data tables on at least one network node, wherein a given synopsis summarizes a set of records in a corresponding data table, and wherein maintaining the given synopsis comprises grouping at least two of the records in the set of records into a combined record; and
in response to a request for a join operation for a set of at least two of said data tables that are distributed across a plurality of network nodes, perform the following steps:
joining, using at least one processing device of a given network node, the synopses associated with said set of data tables to generate a joined synopsis, wherein the joined synopsis comprises one or more of the combined records that are present in each of the synopses associated with said set of data tables;
for joined records in said joined synopsis, obtaining, using the at least one processing device of the given network node, corresponding records from said set of data tables as candidate records; and
joining, using at least one processing device of the given network node, the candidate records.

10. The computer program product of claim 9, wherein said synopses are replicated across said plurality of network nodes.

11. The computer program product of claim 9, wherein said response to said request for said join operation for said set of data tables further comprises the step of broadcasting one or more of said synopses to at least one of said plurality of network nodes.

12. The computer program product of claim 9, wherein the device is further caused to provide incremental updates to one or more of broadcasted synopses and replicated synopses to at least one network node.

13. The computer program product of claim 9, wherein the device is further caused to reduce said candidate records to actual joined records.

14. A system for organizing data in a database, comprising:
a memory; and
at least one processor coupled to the memory and configured for:
maintaining a synopsis for each of a plurality of data tables on at least one network node, wherein a given synopsis summarizes a set of records in a corresponding data table, and wherein maintaining the given synopsis comprises grouping at least two of the records in the set of records into a combined record; and
in response to a request for a join operation for a set of at least two of said data tables that are distributed across a plurality of network nodes, performing the following steps:
joining, using at least one processing device of a given network node, the synopses associated with said set of data tables to generate a joined synopsis, wherein the joined synopsis comprises one or more of the combined records that are present in each of the synopses associated with said set of data tables;
for joined records in said joined synopsis, obtaining, using the at least one processing device of the given network node, corresponding records from said set of data tables as candidate records; and
joining, using at least one processing device of the given network node, the candidate records.

15. The system of claim 14, wherein said synopses comprise one or more of multi-column data record range summaries, horizontal data record alignment tables, outlier values, data point distributions and summaries of minimum and maximum values in data blocks.

16. The system of claim 14, wherein said synopses are replicated across said plurality of network nodes.

17. The system of claim 14, wherein said response to said request for said join operation for said set of data tables further comprises the step of broadcasting one or more of said synopses to at least one of said plurality of network nodes.

18. The system of claim 14, wherein the at least one processor coupled to the memory is further configured for providing incremental updates to one or more of broadcasted synopses and replicated synopses to at least one network node.

19. The computer program product of claim 9, wherein the device is further cause to compute a final join after said candidate records are received.

20. The system of claim 14, wherein the at least one processor coupled to the memory is further configured for reducing said candidate records to actual joined records.

* * * * *